(12) United States Patent
Mayville et al.

(10) Patent No.: US 8,746,147 B1
(45) Date of Patent: Jun. 10, 2014

(54) FILTER FOR GAS GENERATING SYSTEM

(75) Inventors: Brian A. Mayville, Troy, MI (US); Justin W. Ranson, Oxford, MI (US)

(73) Assignee: TK Holdings Inc., Armada, MI (US)

( * ) Notice: Subject to any disclaimer, the term of this patent is extended or adjusted under 35 U.S.C. 154(b) by 160 days.

(21) Appl. No.: 12/797,147

(22) Filed: Jun. 9, 2010

Related U.S. Application Data

(60) Provisional application No. 61/268,117, filed on Jun. 9, 2009.

(51) Int. Cl.
*C06D 5/00* (2006.01)

(52) U.S. Cl.
USPC .......................................... 102/530; 102/531

(58) Field of Classification Search
USPC .................................. 102/530, 531
See application file for complete search history.

(56) References Cited

U.S. PATENT DOCUMENTS

| | | | | |
|---|---|---|---|---|
| 3,423,909 A | * | 1/1969 | Bennett et al. .................. | 55/498 |
| 3,986,838 A | * | 10/1976 | Reichert ....................... | 422/126 |
| 4,158,696 A | * | 6/1979 | Wilhelm ....................... | 422/166 |
| 4,277,261 A | * | 7/1981 | Miko et al. ..................... | 96/391 |
| 4,313,740 A | * | 2/1982 | Kalishman ..................... | 96/66 |
| 4,322,385 A | * | 3/1982 | Goetz .......................... | 422/165 |
| 5,178,547 A | * | 1/1993 | Bonas et al. .................... | 439/34 |
| 5,308,588 A | * | 5/1994 | Emery et al. ................... | 422/165 |
| 5,397,543 A | * | 3/1995 | Anderson ...................... | 422/165 |
| 5,464,249 A | * | 11/1995 | Lauritzen et al. ............. | 280/741 |
| 5,478,112 A | * | 12/1995 | Knobloch ..................... | 280/741 |
| 5,499,843 A | * | 3/1996 | Faigle et al. ................... | 280/741 |
| 6,752,421 B2 | * | 6/2004 | Khandhadia et al. ......... | 280/741 |
| 6,857,658 B2 | * | 2/2005 | Iwai et al. ..................... | 280/741 |
| 7,806,954 B2 | * | 10/2010 | Quioc .......................... | 55/385.3 |
| 2005/0151357 A1 | * | 7/2005 | Yamazaki ..................... | 280/741 |
| 2006/0037298 A1 | * | 2/2006 | Greenwood ................... | 55/525 |
| 2006/0207468 A1 | * | 9/2006 | Blackburn .................... | 102/530 |
| 2007/0227359 A1 | * | 10/2007 | Choi ............................. | 96/11 |
| 2012/0031294 A1 | * | 2/2012 | Aoyagi et al. ................ | 102/530 |

\* cited by examiner

*Primary Examiner* — Samir Abdosh
(74) *Attorney, Agent, or Firm* — L.C. Begin & Associates, PLLC.

(57) ABSTRACT

A tubular filter is provided having an outer edge compressed to an outer dimension within a predetermined range. A gas generating system and a vehicle occupant protection system incorporating the filter are also provided.

6 Claims, 3 Drawing Sheets

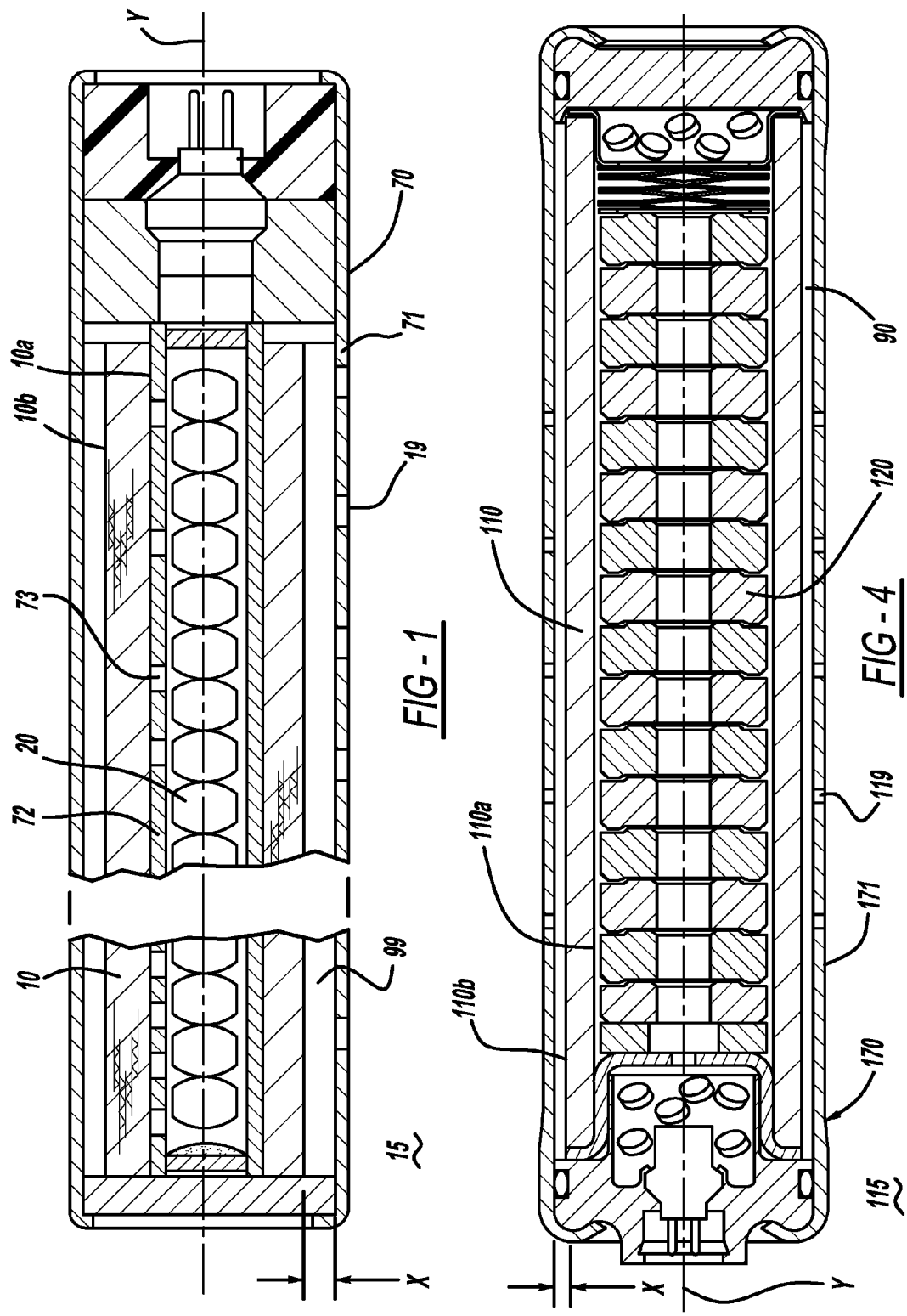

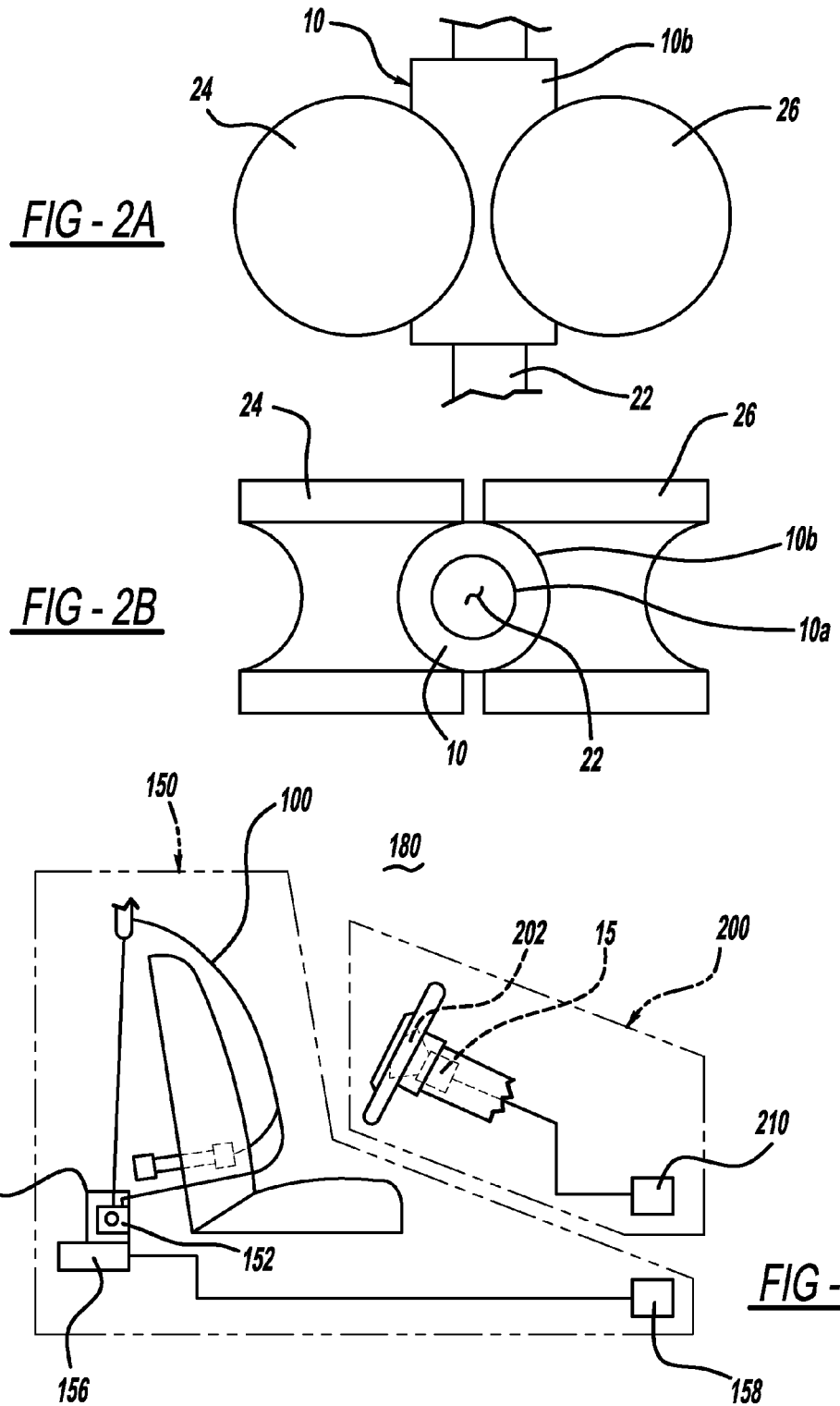

FILTER FOR GAS GENERATING SYSTEM

CROSS REFERENCE TO RELATED APPLICATIONS

This application claims the benefit of provisional application Ser. No. 61/268,117, filed on Jun. 9, 2009, the disclosure of which is incorporated herein by reference.

BACKGROUND OF THE INVENTION

The present invention relates to filters, and, more particularly, to filters for filtering gases produced by combustion of a gas generant material in a gas generating system.

SUMMARY OF THE INVENTION

In one aspect of the embodiments of the present invention, a tubular filter is provided having an outer edge compressed to an outer dimension within a predetermined range.

In another aspect of the embodiments of the present invention, a tubular filter is provided having an inner edge and an outer edge. A portion of the filter proximate the outer edge has an average density greater than an average density of a portion of the filter proximate the inner edge.

In another aspect of the embodiments of the present invention, a method of fabricating a filter is provided. The method includes the steps of forming a quantity of filter material into a substantially cylindrical configuration having an outer edge, the outer edge having an outer dimension with a first value, and compressing at least a portion of the outer edge so that the outer dimension has a second value less than the first value.

BRIEF DESCRIPTION OF THE DRAWINGS

In the drawings illustrating embodiments of the present invention:

FIG. 1 is a cross-sectional side view of a gas generating system incorporating a filter in accordance with an embodiment of the present invention.

FIGS. 2A and 2B are schematic views illustrating a process and apparatus for compressing a filter tube in accordance with an embodiment of the present invention.

FIG. 3 is a schematic view of an airbag system and a vehicle occupant protection system incorporating a filter in accordance with an embodiment of the present invention.

FIG. 4 is a cross-sectional side view of a gas generating system incorporating a filter in accordance with another embodiment of the present invention.

DETAILED DESCRIPTION

Figure 5:
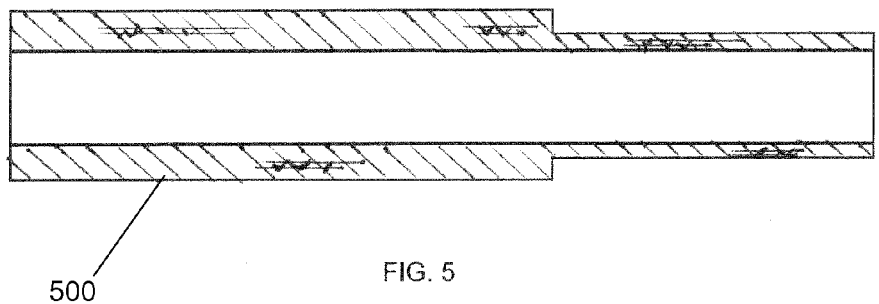
FIG. 5 is a cross-sectional side view of a filter in accordance with another embodiment of the present invention.

FIGS. 1 and 4 show filters 10 and 110, respectively, in accordance with embodiments of the present invention positioned within respective exemplary gas generating systems 15 and 115. Gas generating system 15 or gas generating system 115 may be incorporated into, for example, an inflatable occupant protection system in a motor vehicle. Gas generating systems 15 and 115 are shown for illustrative purposes in cylindrical configurations. However, it should be appreciated that filters in accordance with embodiments of the present invention may be used in gas generating systems having any of a variety of alternative configurations.

Like reference numerals refer to like elements throughout the detailed description. In addition, the view shown in FIG. 4 is similar to the embodiment shown in FIG. 1, except for the omission of combustion chamber 72. Thus, only the embodiment shown in FIG. 1 will be discussed in detail.

Referring to FIG. 1, gas generating system 15 includes a housing 70 having a wall 71 with at least one aperture 19 formed therein to enable fluid communication between an interior of housing 70 and an exterior of the housing. A combustion chamber 72 is formed in an interior of housing 70. Chamber 72 includes at least one aperture 73 formed therein to enable fluid communication between an interior of the combustion chamber and an exterior of the chamber. A gas generant material 20 is positioned in combustion chamber 72 and is ignitable to provide generated gases to a gas-actuatable element (for example, a vehicle airbag) operatively coupled to the gas generating system. In the embodiment shown in FIG. 1, filter 10 is positioned intermediate the aperture (or apertures) 73 in combustion chamber 72 and the aperture (or apertures) 19 in gas generating system housing 70. Gases generated by the combustion of the gas generant 20 in chamber 72 are directed outwardly, passing through apertures 73, through filter 10, and exiting housing 71 via apertures 19.

In the embodiments described herein, filter 10 is generally tubular. The filter may be (but is not necessarily) cylindrical or annular, or the filter may have any other desired tubular cross-sectional shape, for example, a rectangular shape, an octagonal shape, etc.

Also, in the embodiments shown in FIGS. 1-2B, the filter has an inner edge 10a, an outer edge 10b spaced radially apart from inner edge 10a, and two opposed ends 10c and 10d joining the inner and outer edges. A portion of the filter between inner and outer edges 10a and 10b defines a body of the filter.

The inner edge 10a of the filter may be generally defined as a surface connecting the radially innermost portions of the filter mesh or weave. Similarly, the outer edge 10b of the filter may be defined as a surface connecting the outermost portions of the filter mesh or weave. In the embodiment shown in FIGS. 1-2B, inner edge 10a is defined by a surface connecting the radially innermost portions of the filter mesh or weave, and the outer edge 10b is defined as a surface connecting the radially outermost portions of the filter mesh or weave.

As seen in FIG. 1, filter 10 is spaced apart from housing wall 71a minimum predetermined distance X. It has been found desirable to provide a minimum predetermined distance X between filter 10 and aperture(s) 19 to form a plenum 99 exterior of the filter. This plenum provides for more even distribution of the generated gases prior to exiting the filter, reducing the likelihood of localized "hot spots" and aiding in preventing burn-through or degradation of the filter in the vicinity of the aperture(s) 19. The predetermined distance X required for a particular application may depend on such factors as the composition and amount of the gas generant material, the composition and density of the filter, the flow rate of the generated gases from the combustion chamber to the aperture(s) 19, and any other pertinent factors. In a particular embodiment, apertures 19 are substantially uniform in configuration, and the filter 10 is configured in relation to the diameter of housing 70 such that the distance X is at least equal to a largest dimension of one of apertures 19. For example, in an embodiment where apertures are substantially circular in configuration, the distance X would be at least equal to a diameter of one of apertures 19.

Also, as shown in FIG. 4, a filter 110 in accordance with an embodiment of the present invention may be configured to enclose gas generant 20 and to provide the desired spacing X between the filter and the housing 70 without the use of a separate combustion chamber 72.

In one embodiment, filter 10 is in the form of a wire mesh or knitted wire tube, sleeve, or sheet material produced by a conventional wire knitting machine (such as utilized by any commercially available source, for example, Wayne Wire Cloth Products of Kalkaska, Mich. The wire forming the mesh or weave is substantially uniform in composition and cross-sectional geometry. Examples of wire meshes and knits used in high temperature applications can be found in U.S. Pat. Nos. 4,683,010 and 5,449,500, the disclosures of which are incorporated herein by reference.

A tube as formed has an initial an inner diameter dimensioned so as to enable the tube to wrap around or enclose a portion of a gas generating system in which gases are generated. The mesh tube is cut to a particular length so as to fit inside a cavity formed in a housing of the gas generating system.

In another embodiment, the filter tube is formed by rolling a one or more sheets of wire mesh or knitted wire material into a tube having the desired inside diameter. In a particular embodiment, a single sheet of wire mesh or knitted wire material having a substantially uniform initial average density is rolled into a tube having the desired inside diameter. If desired, to form a longer filter sheet for rolling, a composite sheet may be formed from multiple single sheets having substantially equal initial average densities joined end-to-end. Other methods of forming the tubular filter shape may also be used.

Generally, the filter structure will include a mass of filter material sufficient to absorb enough heat from the generated gases to cool the gases to a temperature within a predetermined range prior to the gases exiting the filter. The filter mass required for cooling the generated gases to a temperature within a predetermined range may be determined iteratively through experimentation and testing of samples and/or analytically using computer modeling. The filter mass required for cooling the generated gases may depend on the temperature of the gases, the filter material (i.e., wire, filament, strand, etc.) geometry, the material(s) from which the filter is formed, the spatial arrangement of the material forming the filter, the projected flow distribution of the gases, and any other pertinent factors.

It is also desirable that the filter have sufficient mass along the flow path of the gases to cool any filtered slag particles resulting from combustion of the gas generant before the particles melt through a portion of the filter material or fragment into smaller particles that might pass through the filter. The sizes and/or spatial arrangement of the apertures 73 formed in chamber 72 may be specified so as to aid ensuring that each portion of the filter is sufficiently exposed to the generated gases to maximize heat transfer from the gases to the filter. If desired, one or more baffles (not shown) may be employed to direct the gas flow for this purpose.

Referring to FIGS. 2A and 2B, after formation of the filter tube, the exterior of the tube is compressed to achieve a final outside outer dimension of the tube that is within a predetermined range. This range is defined to have a minimum value which provides the desired minimum spacing X between the filter and the housing wall. The outer surface or initial outer diameter of the filter may be compressed to the desired final outer diameter using any suitable means. In one embodiment, an annular length of filter is mounted on a mandrel 22 dimensioned to substantially conform to the inner diameter of the tube and to substantially resist deformation of the tube in a radially inward direction (i.e., reduction of the inner diameter of the tube during the compression process is resisted by the mandrel supporting the inner surface of the annulus). Thus mounted, the mandrel and filter are passed between a pair of opposed rollers 24, 26 which compress the outer surface of the filter generally toward the mandrel, thereby plastically deforming portions of the filter material to permanently reduce the outside diameter of the filter tube. Rollers 24 and 26 include curved, receding center portions having diameters substantially equal to the filter diameter desired as a result of passage between the particular rollers.

In a particular embodiment, the mounted filter tube is passed through successive pairs of opposed rollers, each pair of opposed rollers further reducing the outside diameter of the filter, to effect a phased compression of the tube outer surface to a final, desired outside diameter. This phased compression may enable a greater total reduction in the final filter outer dimensions. The degree of filter compression performed by each successive set of rollers may be specified according to the characteristics and requirements of the particular filter material and end-use application.

The final outside diameter of the filter tube depends on such factors as the desired spacing between the filter outer diameter and any system element (for example, a wall of an outer housing of the gas generating system) residing adjacent the filter outer diameter, the size of the envelope or volume into which the filter must be positioned, the desired density of the filter, and any other pertinent factors.

It is believed that the more radially outward layers of filter material in contact with or proximate the compression rollers 24 and 26 compress to a greater extent that the layers positioned more radially inwardly. This compression of the filter material increases the average density of the radially outward portions of the filter. In addition, the filter material may tend to flatten or spread as it is compressed, which may reduce the average sizes of the interstices between the wires. The degree of flattening and the resulting shrinkage of the spaces between the wires may be affected by the compression force. Also, the forces applied by the rollers 24 and 26 (or by any other method of compression used) may cause at least a portion of the wires to adhere to each other.

After compression, the filter may have an average density that varies along a radius of the filter. That is, the average density of the filter increases in a direction proceeding from a radially inward location in the filter toward a radially outward location in the filter. Thus, the amount of compression of the outer filter layers may be adjusted to control the average density of both the outer filter layers and the final filter as a whole. This ability to control the average filter density enables a degree of control over the cooling of the gases, the peak gas pressure in the housing interior during combustion, and the effectiveness of the filter in trapping combustion by-product particulates.

The above-described increase in filter density may provide enhanced filtration properties as the generated gases proceed radially outward from the combustion chamber through the filter. It is believed that the higher density outer portions of the filter will tend to trap smaller particulates that the relatively less-disturbed inner portions of the filter, due to the smaller average sizes of the interstices in the more compressed portions of the filter. Thus, in the compressed state, the filter material may trap particulates that might otherwise pass through the uncompressed filter material.

The ability to compress the filter to a desired outside dimension as described also allows the sizes of housing openings 19 to be varied according the requirements of a particular design, while maintaining both a desired minimum mass of filter material and a minimum predetermined spacing between the outer edges of the filter and the wall of the housing in which openings 19 are formed. In addition, compression of the filter permits a greater mass of filter material may be used than would otherwise fit inside a given available housing space, if so desired. This permits increased cooling of the gases.

The desired average density of the filter will depend on such factors as the filter mass and wire surface area required to cool the generated gases to a temperature within a desired range, the allowable pressure drop for gases passing through the filter, the mechanical stresses acting on the wire due to high pressure flow of gases through the filter, the projected sizes of the particulates passing through the filter, the thermal properties of the material (or materials) being used for the filter, and any other pertinent factors.

In particular embodiments of the present invention, filter 10 is formed from a wire of a selected material and cross-sectional configuration knitted into a knit mesh tube or sleeve having a mass per unit length determined to be suitable for filtering gases generated in a gas generating system by combustion of a gas generant material. The wire used to form the mesh may be round or relatively flat, depending on the wire surface area desired for a particular filtering application. The wire may have any diameter suitable for the requirements of a particular application.

The wire used to make the mesh can have any of a variety of compositions. For example, the wire material may be selected from stainless steels, including austenitic and nickel alloys, such as, but not limited to, 304, 309, and 310 grades of stainless steel, or combinations thereof. The composition of the wire may be chosen so as to be chemically compatible (to the extent possible) with the environment in which the filter is disposed and with the generated gases being filtered. Accordingly, other materials can be used, depending upon the environment and the properties of the materials being filtered, and to the extent that such materials can be formed into a compressed filter. The filter can also be formed from a combination of wires having two or more different cross-sectional geometries and/or materials.

The material and cross-sectional dimensions and shape of the wire forming the tube may depend on such factors as the amount of tube deformation required to achieve the desired final outside diameter, the temperature, chemical composition, and velocity of the generated gases impinging on the wire after ignition of the gas generant material, and any other pertinent factors.

Further, additional filter strength can be obtained by heat treating; e.g., annealing the finished filter as described in U.S. Pat. No. 5,449,500, incorporated herein by reference.

If desired, different portions of a filter 500 formed from the same type of wire or filter material may be compressed to different degrees to provide a different average filter density and outer diameter in each filter portion, as seen in FIG. 5 of the drawings. Alternatively, different portions of a filter formed from respective wires or filter materials differing in diameter, composition, etc. may be compressed to different degrees to provide respective portions of the filter having substantially the same densities but different outside diameters. Other combinations and variations of wire configurations or filter materials and compression levels are also contemplated.

In a particular embodiment, meshes or weaves incorporating wires or other filter materials of various materials and/or diameters are used. In one example, an inner layer or portion of the filter residing along or adjacent the filter inner edge (i.e., closest to the combusting gas generant material) is formed from a wire or other filter material having a relatively larger diameter or surface area. The wire or other filter material comprising this portion of the filter is relatively stronger than wire or other filter material having a thinner cross-section, and has a relatively greater mass and surface area for absorbing heat from generated gases. In addition, the wire or other filter material comprising a layer (or layers) of the filter proximate the external or outer edge of the filter are formed from a wire or other filter material having a relatively smaller outer diameter or surface area. The smaller diameter wire or other filter material is relatively less resistant to plastic deformation resulting from compression of the filter outer edge. In this manner, compression of the outer portions of the filter may be further facilitated so that the outer layer (or layers) of the filter will compress more readily and severely than the inner layer (or layers) formed from relatively thicker wire. These factors may be adjusted to affect the operational characteristics of the filter. For example, as described earlier, the amount of compression may be varied to control the final filter outside diameter and the density of the outer portion of the filter. The smaller diameter wire and the larger diameter wire may be knitted together to form the filter. Alternatively, a discrete mesh layer may be formed using each different wire diameter, and the smaller wire diameter layer(s) wrapped over the larger wire diameter layer(s) prior to compression of the outer edge of the filter.

In another particular embodiment, multiple annular tube portions are joined end to end, by means of a joint or other connection mechanism, to form the final filter. Any suitable method may be used to connect the tube portions. For example, wire portions or clips may be used to connect adjoining ends of the tube portions. Alternatively, features may be formed on (or added on to) one or more of the tube portions which facilitate bonding together of abutting sections of the tube portions as a result of pressure applied during the filter compression process. Other types of joints or modes of connection are also contemplated.

Thus, in the manner described above, a tubular filter may be provided having an inner edge and an outer edge, wherein a portion of the filter proximate the outer edge has an average density greater than an average density of a portion of the filter proximate the inner edge Also, in the manner described above, a tubular filter may be provided having an outer edge compressed to an outer dimension within a predetermined range.

Also, in the manner described above, a tubular filter may be provided having an inner edge, an outer edge, and a filter body between the inner and outer edges, wherein a portion of the filter body proximate the outer edge has an average density greater than an average density of a portion of the filter body proximate the inner edge Also, in the manner described above, a substantially cylindrical filter may be provided having an inner edge and an outer edge wherein a portion of the filter extending radially inwardly from the outer edge has an average density greater than an average density of a portion of the filter extending radially outwardly from the inner edge Also in the manner described above, a substantially cylindrical filter may be provided wherein an average density of the filter increases along a radial direction extending from an inner edge of the filter to an outer edge of the filter.

Also, as described above, a method of fabricating a filter is provided which includes the steps of forming a quantity of filter material into a tubular configuration, and compressing an outer edge of the tubular configuration so that a portion of the filter proximate the outer edge has an average density greater than an average density of a portion of the filter proximate the inner edge.

Also, as described above, a method of fabricating a filter is provided which includes the steps of forming a quantity of filter material into a substantially cylindrical configuration having an outer edge, the outer edge having an outer dimension with a first value, and compressing at least a portion of the outer edge so that the outer dimension has a second value less than the first value.

Referring now to FIG. 3, a gas generating system incorporating any of the filter embodiments described herein may be incorporated into an airbag system 200. Airbag system 200 includes at least one airbag 202 and a gas generating system 15 coupled to airbag 202 so as to enable fluid communication with an interior of the airbag for inflating the airbag in the event of a collision. Examples of gas generating systems which may be incorporated into airbag system 200 are described in U.S. Pat. Nos. 6,752,421 and 5,806,888, both incorporated herein by reference. The gas generating system includes an embodiment of filter 10 as described above, for filtering combustion gases generated by the gas generating system.

Airbag system 200 may also include (or be in communication with) a crash event sensor 210 including a known crash sensor algorithm that signals actuation of airbag system 200 via, for example, activation of gas generating system 15 in the event of a collision.

Referring to FIG. 3, airbag system 200 may also be incorporated into a broader, more comprehensive vehicle occupant protection system 180 including additional elements such as a safety belt assembly 150. FIG. 3 shows a schematic diagram of one exemplary embodiment of such a vehicle occupant protection system.

Safety belt assembly 150 includes a safety belt housing 152 and a safety belt 100 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A tubular wire mesh filter having a radially inner edge and a radially outer edge opposite and radially spaced apart from the inner edge, wherein wire forming the filter is uniform in cross-sectional area, and wherein a portion of the filter proximate the radially outer edge has an average density greater than an average density of a portion of the filter proximate the radially inner edge, wherein the filter has a first longitudinal portion with a radially outer edge having a first diameter and a second longitudinal portion adjacent the first portion, the second longitudinal portion having a radially outer edge having a second diameter different from the first diameter, wherein a portion of the filter proximate the first portion radially outer edge has an average density greater than an average density of a portion of the filter proximate the radially inner edge, and wherein a portion of the filter proximate the second portion radially outer edge has an average density greater than an average density of a portion of the filter proximate the radially inner edge.

2. A gas generating system comprising a filter in accordance with claim 1.

3. A vehicle occupant protection system comprising a filter in accordance with claim 1.

4. A gas generating system comprising:
a housing including a wall with at least one gas exit aperture formed therein, the at least one gas exit aperture having a diameter of the aperture; and
a filter in accordance with claim 1 positioned within the housing and spaced apart from the wall of the housing, wherein the filter outer edge is compressed such that a minimum spacing between the outer edge and the housing wall is at least equal to the diameter.

5. A gas generating system comprising a filter in accordance with claim 1.

6. A vehicle occupant protection system comprising a filter in accordance with claim 1.

* * * * *